US012682758B2

(12) United States Patent
　　Dürr

(10) Patent No.: US 12,682,758 B2
(45) Date of Patent: Jul. 14, 2026

(54) TRANSPORTATION NETWORK FOR MULTI-FEATURED AUTONOMOUS VEHICLES

(71) Applicant: Dromos GmbH, Munich (DE)

(72) Inventor: Martin Dürr, Munich (DE)

(73) Assignee: Dromos GmbH, Munich (DE)

( * ) Notice: Subject to any disclaimer, the term of this patent is extended or adjusted under 35 U.S.C. 154(b) by 156 days.

(21) Appl. No.: 18/143,712

(22) Filed: May 5, 2023

(65) Prior Publication Data

US 2023/0274645 A1　　Aug. 31, 2023

Related U.S. Application Data

(63) Continuation-in-part of application No. PCT/EP2021/080744, filed on Nov. 5, 2021.

(30) Foreign Application Priority Data

Nov. 5, 2020　(GB) ..................................... 2017517

(51) Int. Cl.
　　*G08G 1/16*　　　(2006.01)
　　*B60W 60/00*　　(2020.01)
　　*G08G 1/01*　　　(2006.01)
(52) U.S. Cl.
　　CPC ......... *G08G 1/164* (2013.01); *B60W 60/0016* (2020.02); *B60W 60/00272* (2020.02); *B60W 60/00276* (2020.02); *G08G 1/0108* (2013.01)
(58) Field of Classification Search
　　CPC . G08G 1/164; G08G 1/0108; B60W 60/0016; B60W 60/00276;

(Continued)

(56) References Cited

U.S. PATENT DOCUMENTS 10,248,120 B1 *　4/2019　Siegel .................. G05D 1/0223
10,654,476 B2　　5/2020　Wray et al.
(Continued)

FOREIGN PATENT DOCUMENTS

EP　　　2508956 A1　10/2012
EP　　　2854117 A1　　4/2015
(Continued)

*Primary Examiner* — Khoi H Tran
(74) *Attorney, Agent, or Firm* — 24IP Law Group USA, PLLC; Timothy R DeWitt

(57) ABSTRACT

A system for operation of an autonomous transportation network and a method of operation for a plurality of multi-featured autonomous vehicles are disclosed. The system comprises a road, a control management center and a plurality of multi-featured autonomous vehicles. The multi-featured autonomous vehicles include different types of vehicles for transportation of passengers or goods in the autonomous transportation network. The method of operation disclosed comprises selecting permissible routes from an origin to a destination for the multi-featured autonomous vehicles and predicting conflicts for the multi-featured autonomous vehicles. Conflict avoidance instructions are generated and are transmitted to the multi-featured autonomous vehicles using infrastructure elements. The method of operation comprises adjusting the route of the multi-featured autonomous vehicles (20) using corrected route instructions calculated by an onboard processor of the multi-featured autonomous vehicles.

12 Claims, 3 Drawing Sheets

(58) Field of Classification Search
 CPC ....... B60W 60/00272; B60W 60/0011; B60W
  2420/408; B60W 2420/403
 See application file for complete search history.

(56) References Cited

U.S. PATENT DOCUMENTS

| | | | |
|---|---|---|---|
| 10,713,950 B1 * | 7/2020 | Newman ............... | B60W 30/09 |
| 2012/0072051 A1 * | 3/2012 | Koon ................... | G05D 1/0278 |
| | | | 701/2 |
| 2015/0345971 A1 | 12/2015 | Meuleau et al. | |
| 2016/0012990 A1 | 1/2016 | Yang | |
| 2017/0021330 A1 | 1/2017 | Morishita et al. | |

FOREIGN PATENT DOCUMENTS

| | | | | |
|---|---|---|---|---|
| GB | 2427709 A | 1/2007 | | |
| WO | WO-2019152014 A1 * | 8/2019 | ......... | G01C 21/3415 |
| WO | 2021180398 A1 | 9/2021 | | |

* cited by examiner

TRANSPORTATION NETWORK FOR MULTI-FEATURED AUTONOMOUS VEHICLES

CROSS-REFERENCE TO RELATED APPLICATIONS

This application is a Continuation-in Part of PCT Application No. PCT/EP2021/080744 filed on Nov. 5, 2021, which claims priority of UK Patent Application GB2017517.0 which was filed on Nov. 5, 2020. The entire disclosure of the UK Patent Application GB2017517.0 is hereby incorporated herein by reference.

BACKGROUND OF THE INVENTION

Field of the Invention

The invention relates to a computer-implemented system and method for controlling a plurality of multi-featured autonomous vehicles in an autonomous transportation network.

Brief Description of the Related Art

The term "automated transit network" or "automated transportation network" (abbreviated to ATN) is a relatively new designation for a specific transit mode that falls under the larger umbrella term of "automated guideway transits" (AGT). Before 2010, the name "personal rapid transit (PRT)" was used to refer to the ATN concept. In Europe, the ATN has been referred to in the past as "podcars". This document sets out a system and method for improving the routing of multi-featured autonomous vehicles in an autonomous transportation network.

Like all forms of AGT, ATN is composed of autonomous vehicles that run on an infrastructure and are capable of carrying passengers from an origin to a destination. The autonomous vehicles are able to travel from an origin stop at the origin of the passenger's journey to a destination stop at the destination without any intermediate stops or transfers, such as are known on conventional transportation systems like buses, trams (streetcars) or trains. The ATN service is typically non-scheduled, like a taxi, and travelers are able to choose whether to travel alone in the vehicle or share the vehicle with companions.

The ATN concept is different from self-driving cars which are starting to be seen on city streets. The ATN concept has most often been conceived as a public transit mode similar to a train or bus rather than as an individually used consumer product such as a car. Current design concepts of the ATN rely primarily on a central control management for controlling individually the operation of the autonomous vehicles on the ATN. By comparison, self-driving cars are autonomous and rely on self-contained sensors to navigate.

A report on "Automated Transit Networks (ATN): A Review of the State of the Industry and Prospects for the Future" published by the Mineta Transportation Institute, Report No 12-31 in September 2014 reported that at the date of writing no ATN having more than ten stations had been implemented in the world. Currently the ATN networks operate on the principle of mapping each origin to all of the destinations. This leads to a matrix with 20 entries even for a simple five-station system as there are four possible destinations from each of the five origins. A ten-station system would have 90 possible routes and it will be seen that as the number of origins and destinations increases, then an OLD matrix listing all of the possible routes will expand out of hand. The current systems are therefore not scalable.

One of the bottlenecks in an efficient operation of the ATN are highly frequented routes during peak traffic hours during which a large number of users attempt to travel along the same route using the ATN. This large number of users can lead to a traffic overload of the infrastructure of the ATN which causes congestions and can, if not corrected, lead to longer riding times for the users of the system.

The problem is aggravated if different types or sizes of autonomous vehicles are used in the ATN. The use of different vehicles in the ATN system can improve the capacity on highly frequented routes during peak hours or enable freight to be carried on the ATN. However, many ATNs are only configured to handle one identical type of vehicle of uniform size and driving behavior. Methods for the handling of multi-featured vehicles, for example, vehicles of different dimensions or different dynamics, are therefore needed.

A multitude of documents teaching solutions for the avoidance of traffic in public transit systems or individual transport systems are known. For example, the European Patent Application EP 2 854 117 A1 discloses a traffic monitoring system and a corresponding method. The system and method comprise generating a database of historical time-dependent traffic speeds or transit times for route segments in a map database for each of a plurality of time windows. The system and method identify currently congested route segments on which the current traffic speed or transit time is less than expected and predict a traffic speed or transit time at a future time for a currently congested route segment based on a comparison of recently observed traffic speeds or transit times. This is done using the historical average traffic speed or transit time for the appropriate time window. The prediction also comprises relating the recently observed traffic speeds or transit times to the historical average traffic speed or transit time.

U.S. Pat. No. 10,654,476 B2 describes a control method and system for vehicle operation management in a transportation network. The system and method comprise capturing, by a sensor of the vehicle, data representing an operational environment of the vehicle. The system and method further comprise generating multiple operational scenarios for possible situations of conflict between two or more of the vehicles in the transportation network, predicting possible future interactions using the captured sensor data and a processing unit. The patent, however, remains silent on the use of a control management center for centrally managing the routes of the vehicles travelling in the transportation network.

A further example of a path planning method in a transportation network can be found in US Patent Application US 2016/0129907 A1. The document discloses a route planning apparatus for an autonomous vehicle. The apparatus includes a driving information sensor to detect road and traffic information. A control management center predicts positions of the autonomous vehicles, and an environment recognizer recognizes obstacles and road information. The apparatus also includes a velocity profile generator to generate real vehicle dynamics for the autonomous vehicles in the network. The apparatus further includes a vehicle route planner to plan permissible routes for the vehicle, using the vehicle dynamics, the predicted positions, and a route selector to check whether or not the vehicle routes have collision risks and to select one of the vehicle routes for the autonomous vehicles.

US Patent Application US2017/0213308 A1 discloses a method for a transportation system processing ride requests for multiple passengers of an autonomous vehicle-based transportation system. Each ride request is associated with an origin and a destination. The system calculates a route for each actively operating autonomous vehicle, wherein each route is based at least in part on the origins and destinations associated with the ride requests. The actively operating autonomous vehicles are centrally controlled in a control management center to satisfy the ride requests using vehicle data, for example, vehicle speed data, vehicle acceleration data, vehicle trajectory data, geographical position data for the vehicle, vehicle navigation data. The method further comprises use of current and forecast traffic data. The focus of the application lies on the transportation of individual passengers in a transportation network.

European Patent application EP 2 508 956 A1 describes a system and method for avoiding collisions between vehicles moving in a predetermined area. The vehicles are equipped with position sensors to detect their positions within the predetermined area. The vehicles further contain a wireless communication unit for the communication with a control management center. The system further comprises a central collision avoidance calculation module. The central collision avoidance module continuously receives position data from each of the vehicles and is capable of calculating future positions of the vehicles based on previously stored items of data relating to the position of the vehicles. Using the received items of data, the central collision avoidance calculation module predicts possible future positions of the vehicles in and determines possible collisions. In case a possible collision is detected, the central collision avoidance calculation module generates and sends collision avoidance instructions. These collision avoidance instructions are, for example a command to slow-down the vehicle.

UK patent application GB 2427709 A describes a method and system for controlling of autonomous vehicles in a station. The vehicles are controlled in the station by a control management center using predetermined routes referred to as "movement envelopes". The movement envelopes comprise the possible positions of the vehicles over a period of time between a specific start time and a specific end time. Possible conflicts are calculated by the control management center. If the control management center determines the conflict, the control management center communicates an alternate start time to one of the autonomous vehicles to avoid the conflict.

U.S. Pat. No. 10,248,120 B1 describes a system comprising a navigable path network. A customer may place an order for an item to be delivered from a fulfillment center over a communications network. The navigable path network may be utilized by one or more autonomous vehicles in the performance of any mission or task. A plurality of autonomous vehicles travel on the navigable path network. These autonomous vehicles have a number of different dimensions, operating features, or other attributes. It is further described that attributes of the various paths of the navigable path network may be maintained in a vehicle monitoring system that is connected to the communications network and communicated with the fulfillment center and/ or one or more of the autonomous vehicles. Upon receiving the order from the customer, attributes of the various paths extending between the fulfillment center and the customer may be provided to computer devices associated with the fulfillment center and/or one or more of the autonomous vehicles over the communications network. It is further described that the vehicle mentoring system determines the optimal routes for autonomous vehicles. The U.S. Pat. No. 10,248,120 B1 does not disclose calculating, in the control management center and the at least one of the plurality multi-featured autonomous vehicles, a plurality of permissible routes from an origin to the destination, wherein the calculating in the control management center is done independently from the calculating in the at least one of the plurality multi-featured autonomous vehicles.

US patent application US 2015/345971 A1 describes a system and method for synchronously updating vehicle network information for use in autonomous vehicles and navigation. The system comprises a plurality of autonomous vehicles, each comprising a control unit. The control unit may include a location unit, an electronic communication unit, a processor, a memory, a user interface, a sensor, an electronic communication interface. The communication unit is configured to transmit or receive signals via a wired or wireless medium, such as via the communication interface. The vehicle further comprises a trajectory controller. The trajectory controller is operable to obtain information describing a current state of the autonomous vehicle and a route planned for the autonomous vehicle, and based on this information, to determine and optimize a trajectory for the autonomous vehicle. In some embodiments, the trajectory controller may output signals operable to control the autonomous vehicle such that the autonomous vehicle follows the trajectory that is determined by the trajectory controller. The US patent application US 2015/345971 A1 does not, however, disclose calculating, in the control management center and the at least one of the plurality multi-featured autonomous vehicles, a plurality of permissible routes from an origin to the destination, wherein the calculating in the control management center is done independently from the calculating in the at least one of the plurality multi-featured autonomous vehicles.

US patent application US 2012/072051 A1 describes an autonomous vehicle transit system for controlling vehicle movement of a plurality of trackless vehicles in the transit system. The system comprises a command, control and orchestration system (CCOS) and a plurality of vehicle controllers, each vehicle controller associated with a trackless vehicle of the plurality of trackless vehicles and operative to communicate vehicle position information to the CCOS, to receive a navigation command, and to control the trackless vehicle according to the navigation command. The CCOS is operative to provide navigation commands to the plurality of vehicle controllers to control movements of the plurality of trackless vehicles within the transit system according to vehicle position information received from the plurality of vehicle controllers. The US patent application US 2012/072051 A1 does not, however, disclose calculating, in the control management center and the at least one of the plurality multi-featured autonomous vehicles, a plurality of permissible routes from an origin to the destination, wherein the calculating in the control management center is done independently from the calculating in the at least one of the plurality multi-featured autonomous vehicles.

None of the cited patents address the need to proactively manage an autonomous transportation network allowing to avoid future route conflicts, using previous traffic data, and considering vehicle features, for example, dimensions or dynamics.

SUMMARY OF THE INVENTION

The present document describes a system and method for operating an autonomous transportation network for a plurality of multi-featured autonomous vehicles travelling a route between an origin and a destination along permissible routes. The method comprises receiving a request from a passenger by a control management center, wherein the request comprises the destination.

The method further comprises transmitting the request to at least one of the plurality of the multi-featured autonomous vehicles. The method also comprises calculating, in the control management center and in the at least one of the plurality multi-featured autonomous vehicles, a plurality of permissible routes from the origin to the destination, wherein the calculating in the control management center is done independently from the calculating in the at least one of the plurality multi-featured autonomous vehicles.

The method also comprises selecting a route from the plurality of permissible routes for the at least one of the plurality of the multi-featured autonomous vehicles, wherein the selecting in the control management center is done independently from the selecting in the at least one of the plurality multi-featured autonomous vehicles. The permissible routes are defined for the multi-featured autonomous vehicles and use using traffic data and vehicle features. The vehicle features include permissible vehicle dimensions and permissible vehicle dynamics of the multi-featured autonomous vehicles of the roads.

The method also comprises predicting, using a plurality of predicted positions and a traffic pattern model stored in the control management center, conflicts for the at least one of the plurality of the multi-featured autonomous vehicles. The method further comprises generating, using the conflicts predicted by the control management center, conflict avoidance instructions. The method also comprises adjusting the route of the at least one of the plurality of the multi-featured autonomous vehicles.

Suppose, for example, one the multi-featured autonomous vehicles requires more than one lane of a multi-lane road because the multi-featured autonomous vehicle is oversized, then, other ones of the multi-featured autonomous vehicles are directed to diversionary routes to free up additional space on the multi-lane road. Similarly, if the speed of one of the multi-featured autonomous vehicles is slower than the general speed of the other ones of the multi-featured autonomous vehicles, then ones of the multi-featured autonomous vehicles can be influenced or diverted to enable the slower multi-featured autonomous vehicle to proceed along one route and the other ones of the multi-featured autonomous vehicles to proceed along another route.

The method further comprises continuously updating the traffic pattern model based on travel patterns of the multi-featured autonomous vehicles using interaction data from at least one of a plurality of sensing elements and a deep-learning algorithm. The method also comprises transmitting the conflict avoidance instructions, using ones of infrastructure elements, to at least one of the multi-featured autonomous vehicles and thereby adjusting the route of the multi-featured autonomous vehicles.

The method further comprises determining available road space for avoidance of the conflicts and enabling movement of ones of the plurality of the multi-featured autonomous vehicles by determining presence of ones of the multi-featured autonomous vehicles or objects at the predicted positions. The method also comprises notifying other ones of the plurality of multi-featured autonomous vehicles to avoid the conflicts, using infrastructure elements transmitting the conflict avoidance instructions.

The method also comprises transmitting to at least one of the plurality of the multi-featured autonomous vehicles travelling on a diversionary route conflict avoidance instructions, using ones of infrastructure elements, to enable another one of the moving multi-featured autonomous vehicles to proceed unhindered along the diversionary route.

In a further example, the method described can adjust the speed of one of the multi-featured autonomous vehicles, therefore avoiding conflicts with other ones of the plurality of multi-featured autonomous vehicles.

The infrastructure elements receive the notification on the conflicts along the route from the control management center to inform one of the multi-featured autonomous vehicles. The multi-featured autonomous vehicle receives the notification on the conflicts relevant for the selected one of the multi-featured autonomous vehicles and is able to autonomously find corrected route instructions for the diversionary route.

The system for operation of the autonomous transportation network comprises a central memory comprising the traffic pattern model for the autonomous transportation network, and the plurality of the permissible routes between the origin and the destination for the plurality of multi-featured autonomous vehicles in the autonomous transportation network. A control management processor calculates details of the routes being travelled by the multi-featured autonomous vehicles and predicts the potential conflicts between ones of the multi-featured autonomous vehicles. The control management processor notifies infrastructure elements in the autonomous transportation network to redirect some of the multi-feature autonomous vehicles along different routes on detection of the potential conflicts. The control management processor uses the traffic pattern model to determine which of the multi-featured autonomous vehicles should be redirected.

DETAILED DESCRIPTION OF THE INVENTION

The invention will now be described on the basis of the figures. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
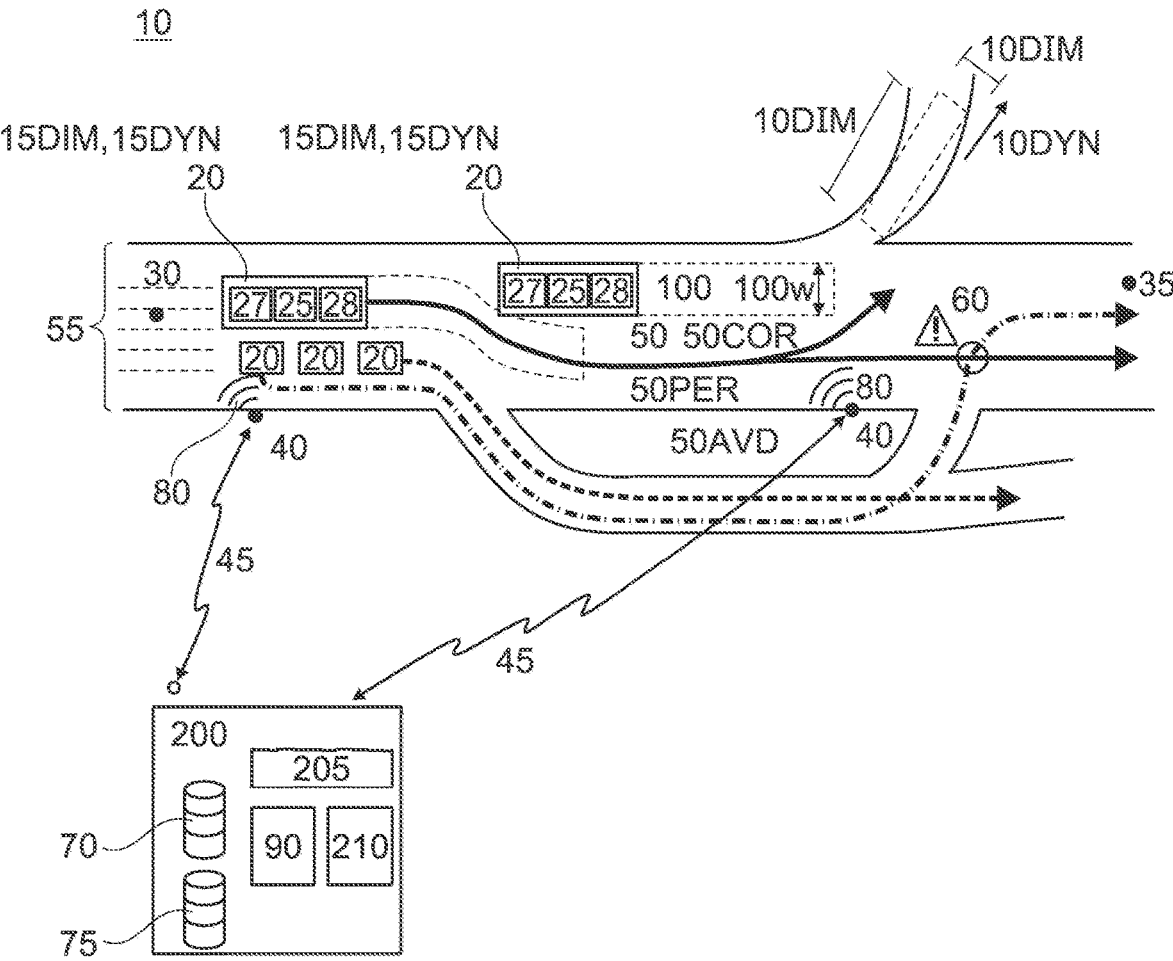
FIG. 1 shows a view of the autonomous transportation network.

FIG. 1 shows a view of the autonomous transportation network 10. The autonomous transportation network 10 comprises at least one road 55, at least one control management center 200, a plurality of multi-featured autonomous vehicles 20, a plurality of sensing elements 40, and a plurality of infrastructure elements 80, such as beacons to communicate with the multi-featured autonomous vehicles 20. The plurality of multi-featured autonomous vehicles 20 include different types of the multi-featured autonomous vehicles 20 for transportation of passengers 29 or goods in the autonomous transportation network 10. The multi-featured autonomous vehicles 20 have real vehicle dimensions 15DIM and real vehicle dynamics 15DYN. The real vehicle dimensions 15DIM and the real vehicle dynamics 15DYN of the multi-featured autonomous vehicles 20 can differ from one another, for example, for differently sized ones of the multi-featured autonomous vehicles 20. The real vehicle dynamics 15DYN are, for example, the acceleration pattern of one of the plurality of the multi-featured autonomous vehicles 20. The multi-featured autonomous vehicle 20 having a greater width or a greater weight will show different values for the acceleration compared to the multi-featured autonomous vehicles 20 of smaller size or weight.

The multi-featured autonomous vehicles 20 have an onboard processor 27 for selection of a route 50 between an origin 30 and a destination 35, a vehicle memory 25 for storing of a structure model 75 (as discussed below), and a vehicle antenna 28 for sending and receiving items of information. The multi-featured autonomous vehicles 20 travel autonomously in the autonomous transportation network 10, independently determining and travelling the route 50 from the origin 30 to the destination 35 along the road 55. The multi-featured autonomous vehicles 20 travelling in the autonomous transportation network 10 are independent and are not in communication with one another.

The road 55 has restrictions 65 which limit the types of the multi-featured autonomous vehicles 20 that can travel on the road 55. The road 55 can be a single-lane road 55 on which the multi-featured autonomous vehicles 20 can travel in both directions, a normal road with a separate lane in each direction for the multi-featured autonomous vehicles 20, or a multi-lane road 55 with at least three lanes. Sections of the road 55 can include multiple features, such as stops, bridges, tunnels. The features can limit the type of the multi-featured autonomous vehicles 20 that can travel on the section of the road 55. For example, the properties of one of the sections of the road 55 might include a width, a height, a curvature, an incline, or a weight restriction limiting the road 55, only allowing specific ones of the multi-featured autonomous vehicles 20 to travel on the section of the road 55. In other words, the multi-featured autonomous vehicles 20 allowed to travel on the section of the road 55 must fulfill certain criteria which are defined by permissible vehicle dimensions 10DIM and permissible vehicle dynamics 10DYN set for the section of the road 55 in the autonomous transportation network 10.

The multi-featured autonomous vehicle 20 is able to determine independently and travel along the route 50 in the autonomous transportation network 10 using the structure model 75 stored in the vehicle memory 28. The structure model 75 is a network map of the autonomous transportation network 10 and includes information about any comprising restrictions for the road(s) 55 in the autonomous transportation network 10. The structure model 75 further comprises details of the routes 50 that the multi-featured autonomous vehicles 20 can travel from the origin 30 to the destination 35. In the present non-limiting example, the structure model 75 comprises (on average) 30.000 possible routes 50 for travelling from any one of the origins 30 to the destinations 35.

The restrictions on the roads 55 could be, but are not limited to, weight, speed, and size restrictions. The restrictions could further include size restrictions for stations, stops or loading and unloading areas (e.g., at the origin 30 and the destination 35 on the route 50) or a number of lanes available in one of the stations or stops defined in the autonomous transportation network 10. Some of the stations, stops or loading/unloading areas in the autonomous transportation network 10 might, for example, also be designed to allow oversized multi-featured autonomous vehicles 20 to stop whereas other stations or stops might only be able to accommodate smaller multi-featured autonomous vehicles 20.

The onboard processor 27 selects the permissible routes 50PER along which the multi-featured autonomous vehicles 20 may travel using the real vehicle dimensions 15DIM and the real vehicle dynamics 15DYN of the multi-featured autonomous vehicle 20. The selection of the permissible routes 50PER comprises using and comparing the permissible vehicle dimensions 10DIM and the permissible vehicle dynamics 10DYN of the road(s) 55 to the real vehicle dimensions 15DIM and the real vehicle dynamics 15DYN. The route 50 is then travelled by the multi-featured autonomous vehicle 20. The autonomous vehicles 20 can send and receive information to the control management center 200.

The control management center 200 comprises a control management processor 205 and a central memory 210. The control management center 200 further comprises a traffic pattern model 70, a structure model 75, and a deep-learning algorithm 90. The control management processor 205 is used for the calculation of the traffic pattern model 70 using the deep-learning algorithm 90. The central memory 210 is used for storing of the traffic pattern model 70, the structure model 75 and the plurality of permissible routes 50PER. The control management center 200, however, only notifies the multi-featured autonomous vehicles 20 to adjust the routes 50 if a conflict 60 between two or more of the multi-featured autonomous vehicles 20 is predicted, as is further explained in the description of FIG. 2.

The traffic pattern model 70 comprises items of interaction data 45 correlated by the deep-learning algorithm 90. The items of interaction data 45 comprise current and past interactions of the multi-featured autonomous vehicles 20 with the sensing elements 40. The selected permissible routes 50PER are used for calculation of predicted positions 100 of the multi-featured autonomous vehicles 20. The predicted positions 100 indicate parts of the route 50 travelled by the multi-featured autonomous vehicles 20 at an instance of time (t) and thus will be used by one of the multi-featured autonomous vehicles 20 in the future. It will be appreciated that the predicted position 100 may comprise more than one lane of the route 50 if the multi-featured autonomous vehicle 20 is wider than a single lane. The predicted positions 100 and the traffic pattern model 70 are used for predicting the future conflicts 60 between at least two of the multi-featured autonomous vehicles 20 travelling in the autonomous transportation network 10.

The future conflicts 60 will be detected when the predicted positions 100 of two different ones of the multi-featured autonomous vehicles 20 overlap at a same or similar predicted time. The overlap of the predicted positions 100, indicating the conflicts 60 in the autonomous transportation network 10, is predicted for avoiding of, for example, one of the multi-featured autonomous vehicles 20 travelling at a lower speed or requiring more space on the road 55.

The control management center 200 stores a plurality of the permissible routes 50PER from the origin 30 to the destination 35 for the multi-featured autonomous vehicles 20. The permissible routes 50PER are calculated by considering the real vehicle dimensions 15DIM and the real vehicle dynamics 15DYN of the multi-featured autonomous vehicles 20 compared to the permissible vehicle dimensions 10DIM and the permissible vehicle dynamics 10DYN of the road(s) 55 on the permissible routes 50PER. If the control management center 200 predicts at least one conflict 60 for at least one of the multi-featured autonomous vehicles 20, then conflict avoidance instructions 50AVD for at least one of the multi-featured autonomous vehicles 20 are generated. The conflict avoidance instructions 50AVD comprise, for example, a road 55 or a lane of a road 55 that must be avoided by the other ones of the multi-featured autonomous vehicles 20 in order to avoid the predicted conflict 60.

Another example of the conflicts 60 would be, at an intersection, at which two or more multi-featured autonomous vehicles 20 approach the intersection at the same time, thereby causing a potential one of the conflicts 60. The control management center 200, having predicted said conflicts 60, can inform the infrastructure elements 80 to notify at least one of the multi-featured autonomous vehicles 20 to avoid a certain route 50 or to travel at a different speed in order to avoid the conflict 60 at the intersection.

In a further example, the control management center 200 can inform the infrastructure elements 80 to notify one of the multi-featured autonomous vehicles 20 of the conflict 60 before a section of merging lanes of one or multiple roads 55 in order to avoid the conflicts 60. If, for example, three of the multi-featured autonomous vehicles 20 share a common route 50 or common part of the route 50 and need to merge at the section of merging lanes, the control management will send conflict avoidance instructions 50AVD to one or multiple ones of the multi-featured autonomous vehicles 20 notifying at least one multi-featured autonomous vehicle 20 to reduce speed or (if possible and safe) increase speed in order to avoid the predicted conflict 60 and merge smoothly into the path of the other ones of the multi-featured autonomous vehicles 20. This enables efficient use of available space on the road 55 by the multi-featured autonomous vehicles 20 and can mean that there is no need to initiate a sharp braking and stopping process, which is wasteful of energy and time-consuming for the passenger 29. The merging of the autonomous vehicles is described in the Applicant's co-pending UK Patent Application No. GB 2005607.3 filed on 17 Apr. 2020.

The conflict avoidance instructions 50AVD are transmitted to ones of the infrastructure elements 80 along the route 50. The infrastructure elements 80 notify (as is described below in further detail) at least one of the multi-featured autonomous vehicles 20 about the conflict avoidance instructions 50AVD. The multi-featured autonomous vehicle 20 then calculates, using the onboard processor 27 and the structure model 75 stored in the vehicle memory 28, corrected route instructions 50COR based on the conflict avoidance instructions 50AVD. The control management processor 205 also locally calculates corrected route instructions 50COR for the adjustment of the route 50. Because the structure model 75 stored in the central memory 210 is identical to the structure model 75 stored in the vehicle memory 28, the corrected route instructions 50COR calculated by the central management processor 205 will be identical to the corrected route instructions 50COR calculated by the onboard processor 27. Using the corrected route instructions 50COR, the one of the plurality of the multi-featured autonomous vehicles 20 adjusts, for example, the speed or the route 50 of the multi-featured autonomous vehicles 20.

The control management center 200 is connected to the infrastructure elements 80 using fixed communication lines. It would also be possible to use wireless connections over the distance between the infrastructure elements 80 and the control management center 200 or over part of the distance. The central memory 210 includes geographic data about the autonomous transportation network 10 including the location of the infrastructure elements 80. In the event that the control management center 200 determines the conflict 60, the control management center 200 calculates conflict avoidance instructions 50AVD and transmits the conflict avoidance instructions 50AVD to the infrastructure elements 80. The control management center 200 does not send these conflict avoidance instructions 50AVD directly to the multi-featured autonomous vehicles 20, but the conflict avoidance instructions 50AVD are sent to one or more of the infrastructure elements 80 which can then transmit the conflict avoidance instructions 50AVD. The multi-featured autonomous vehicles 20 will, for example, redirect or change speed upon receiving of the conflict avoidance instructions 50AVD (see also explanation of FIG. 2).

The communication between the infrastructure elements 80 and the autonomous vehicles 20 is carried out locally and does not require much power. Only those infrastructure elements 80 near the position of the multi-featured autonomous vehicles 20 need to be provided with the conflict avoidance instructions 50AVD. The local transmission of information between the infrastructure element 80 and the multi-featured autonomous vehicles 20 also reduces the risks of hacking of the autonomous transportation network 10 as the amount of data transmitted is very small and the distances of wireless transmission are also short. The infrastructure element 80 uses, for example, Near-field-communication technologies (NFC) or wireless network protocols (Wi-Fi).

The control management center 200 can further be configured to notify other ones of the plurality of the multi-featured autonomous vehicles 20, again using the infrastructure elements 80 as described above, to avoid the predicted positions 100 along the roads 55. This notification enables, for example, temporarily influencing the route 50 of the multi-featured autonomous vehicles 20 travelling on the two or more lanes of a multi-lane road 55 if the real vehicle dimensions 15DIM of one of the plurality of the multi-featured autonomous vehicles 20 are greater than the permissible vehicle dimensions 10DIM of a single lane of the multi-lane road 55. This notification also includes influencing the route 50 of the multi-featured autonomous vehicles 20 travelling on a diversionary route 50 to enable use of the diversionary route 50 by one of the moving multi-featured autonomous vehicles 20 to enable the multi-featured autonomous vehicle 20 to proceed unhindered along the diversionary route 50. In another example, this notification comprises adjusting the speeds of other ones of the plurality of the multi-featured autonomous vehicles 20 to free space on the road 55 for a first one of the plurality of moving multi-featured autonomous vehicles 20. Similarly, the speed of arriving ones of the multi-featured autonomous vehicles 20 at a junction can be adjusted to avoid entry of the arriving multi-featured autonomous vehicles 20 in the predicted positions 100 of one of the moving multi-featured autonomous vehicles 20 in the junction.

Figure 2A:
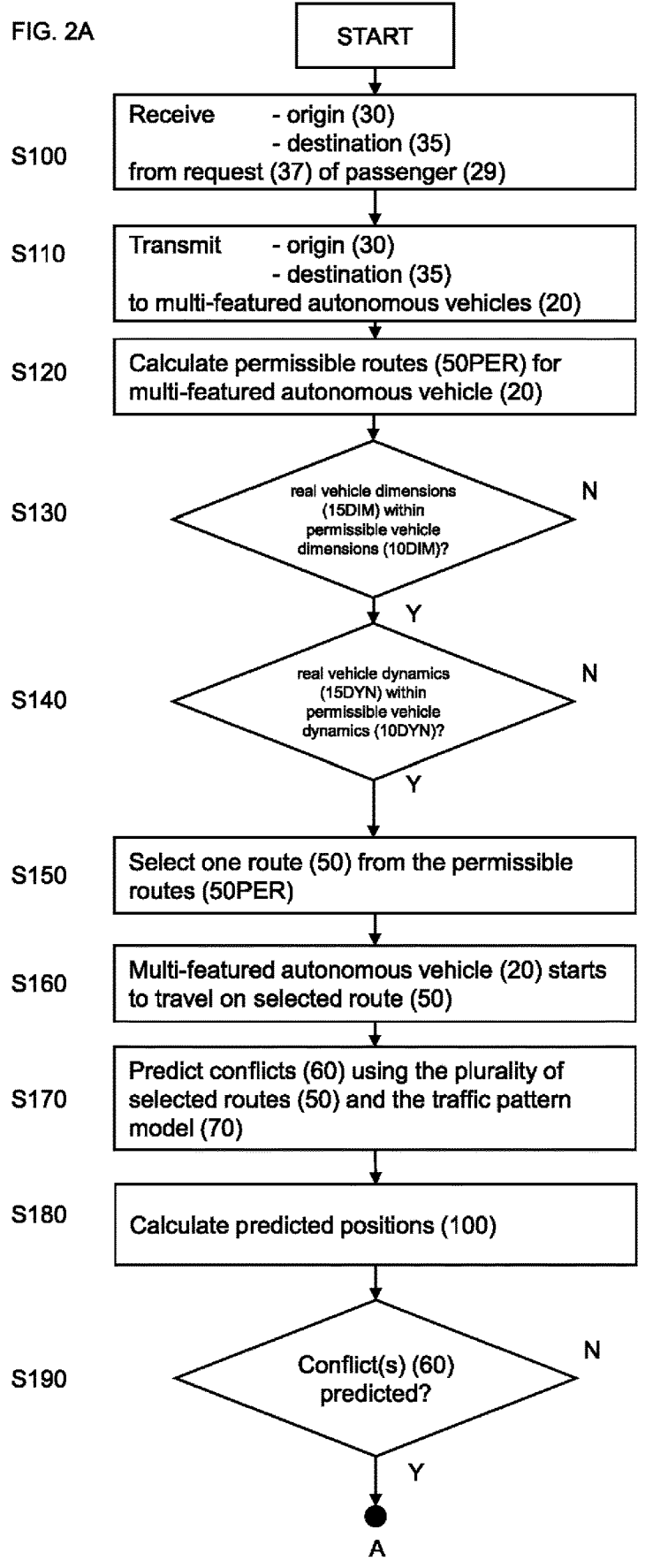
FIGS. 2A and 2B show flow charts describing the operation of the autonomous transportation network.

FIG. 2A shows a flow chart describing the operation of the autonomous transportation network 10. In step S100, the control management center 200 receives the destination 35 from a request 37 of a passenger 29. This request 37 is made for example by phone or using an app on a smartphone. It would also be possible to use a control and information point at the origin 30 if this control and information point is provided or to call a phone help line to arrange for a pick-up at the origin 30 by one of the multi-featured autonomous vehicles 20. The origin 30 can be determined either by using GPS coordinates transmitted in the request 37 from a smartphone, by submitting the current position of the passenger 29 in the autonomous transportation network 10 using the app or by knowing the position of the control and information point from which a request was sent.

The control management center 200 sends, in step S110, the request 37 to one of the plurality of the infrastructure elements 80. One of the plurality of the infrastructure elements 80 having received the request 37 transmits the request 37 to the multi-featured autonomous vehicles 20. The control management center 200 can decide, based on the current interaction data 45 and the traffic pattern model 70, which one of the plurality of the multi-featured autonomous vehicles 20 should receive the request 37 from the infrastructure elements 80 to pick-up the passenger 29. If the control management center 200 predicts, for example, the conflict 60 for the request 37 by the passenger 29, the control management center 200 can decide to delay a departure from the origin 30 by a certain amount of time to avoid the predicted conflict 60 in the future.

The onboard processor 27 of the multi-featured autonomous vehicles 20 selects one of the permissible routes 50PER using the structure model 75 stored in the vehicle memory 28 and the request 37 received from one of the infrastructure elements 80 using the vehicle antenna 25. By using the structure model 75, the onboard processor 27 should always select an identical route 50 from the origin 30 to the destination 35 if identical parameters are used. This method allows for the control center 200 to select the identical route 50 from the origin 30 to the destination 35 as is selected by the onboard processor 27 of the multi-featured autonomous vehicle 20. The onboard processor 27 and the control center 200 will therefore select identical routes 50 without needing to communicate. The behavior of the multi-featured autonomous vehicle 20 therefore is predictable.

In step S120 the plurality of the permissible routes 50PER for the multi-featured autonomous vehicles 20 are selected using the detected origin 30, the detected destination 35 and the possible routes 50 stored in the structure model 75. Selecting the permissible routes 50PER comprises comparing, in step S130, the real vehicle dimensions 15DIM of the multi-featured autonomous vehicles 20 to the permissible vehicle dimensions 10DIM of at least one road 55 on one of the possible routes 50 stored in the structure model 75 from the origin 30 to the destination 35. If the real vehicle dimensions 15DIM are smaller or equal than the permissible vehicle dimensions 10DIM, the selected route is permissible regarding the dimensions of the multi-featured autonomous vehicle 20. In this case, the next step is S140 (see below).

If the real vehicle dimensions 15DIM are larger than the permissible vehicle dimensions 10DIM, the selected route is not permissible regarding dimensions of the multi-featured autonomous vehicle 20. In this case, a different route 50 has to be selected and step S120 is reiterated. Selecting the permissible routes 50PER further comprises comparing, in step S140, the real vehicle dynamics 15DYN of the multi-featured autonomous vehicles 20 to the permissible vehicle dynamics 10DYN of at least one road 55 on one of the possible routes 50 from the origin 30 to the destination 35.

If the real vehicle dynamics 15DYN are within a range of the permissible vehicle dynamics 10DYN, the selected route is permissible regarding dynamics of the multi-featured autonomous vehicle 20. If the real vehicle dynamics 15DYN are not within the range of the permissible vehicle dynamics 10DYN, the selected route is not permissible regarding the dynamics of the multi-featured autonomous vehicle 20. In this case, a different route 50 has to be selected and step S120 is reiterated. In step S150 the onboard processor 27 of the multi-featured autonomous vehicle 20 selects one route 50 from the permissible routes 50PER. The selecting of the route 50 can, for example, be based on minimizing a travel time or a distance from the origin 30 to the destination 35.

As noted above, the selecting in step S150 of the route 50 is done using predefined criteria for the autonomous transportation network 10 therefore ensuring that the multi-featured autonomous vehicles 20 and the control management center 200 will select identical routes 50 from the origin 30 to the destination 35. The multi-featured autonomous vehicles 20 and the control management center 200 select the route 50 The multi-featured autonomous vehicles 20 and the control management center 200 therefore do not need to communicate the selected route 50 to each other.

At around the same time after sending the request 37 to the multi-featured autonomous vehicles 20 in step S110, the control management center 200 will independently calculate the route 50 to the destination 35. The structure model 75 stored in the multi-featured autonomous vehicles 20 is identical to the structure model 75 stored in the central memory 210. The control management center 200 will thus know the route 50 that the multi-featured autonomous vehicles 20 will take between the origin 30 and the destination 35. The selection of the route 50 in the control management center 200 comprises the same steps as already described for the multi-featured autonomous vehicle 20 in step S120 to step S150.

The calculation of the route 50 and the selection of the route 50 in the multi-featured autonomous vehicles 20 and the calculation of the route 50 and the selection of the route 50 in the control management center 200 will be performed separately from each other in real-time. The calculation of the route 50 and the selection of the route 50 are based on the structure model 75 stored in the multi-featured autonomous vehicles 20 and the structure model 75 stored in the control management center 200. The calculation of the route 50 and the selection of the route 50 will initially not consider any disturbances, such as, but not limited to traffic accidents or traffic jams. Once the route 50 has been selected in the onboard processor 27, the multi-featured autonomous vehicle 20 will start its journey from the origin 30 to the destination 35 in step S160.

The purpose of this dual calculation of the routes 50 is to enable the control management center 200 to determine what is happening in real-time in the autonomous transportation network 10 without constantly needing to communicate with the plurality of the multi-featured autonomous vehicles 20. There will not be a single passenger 29 requesting a single one of the multi-featured autonomous vehicles 20, but a number of passengers 29 requesting a number of multi-featured autonomous vehicles 20 from a plurality of the origins 30 and going to a plurality of the destinations 35. It is the role of the control management center 200 in step S170 to simulate the traffic demand and the routing of the multi-featured autonomous vehicles 20 and, if necessary, make changes to the routes 50 to use diversionary routes 50, influencing the route 50 of at least one of the multi-featured autonomous vehicles 20 travelling on the one or more lanes of a multi-lane road 55, or adjust the speed of travel of at least one of the multi-featured autonomous vehicles 20.

The control management center 200 predicts the conflicts 60 in step S170, using the plurality of selected routes 50 for the multi-featured autonomous vehicles 20 and the traffic pattern model 70. The traffic pattern model 70 comprises items of current and past interactions of the multi-featured autonomous vehicles 20 with the sensing elements 40, wherein ones of the detected interactions are stored as items of interaction data 45. The items of interaction data 45 are correlated by the deep-learning algorithm 90 for detecting patterns in the items of interaction data 45. The detected patterns are used for predicting a traffic for at least one of the roads 55 in a future timespan, for example, the next 15 minutes, based on the current items of interaction data 45. The control management center 200 uses the predicted traffic in the future timespan for predicting of the conflicts 60.

Therefore, the predicted positions 100 are calculated in step S180 by the control management center 200 using the selected permissible routes 50PER for the plurality of the multi-featured autonomous vehicles 20, wherein the predicted position 100 is representative of the future route 50 travelled by the multi-featured autonomous vehicle 20 in a set period of time (t). The predicted position 100 is used for the predicting of the conflicts 60 from overlaps of the predicted positions 100 for the ones of the plurality of multi-featured autonomous vehicles 20.

Figure 2B:
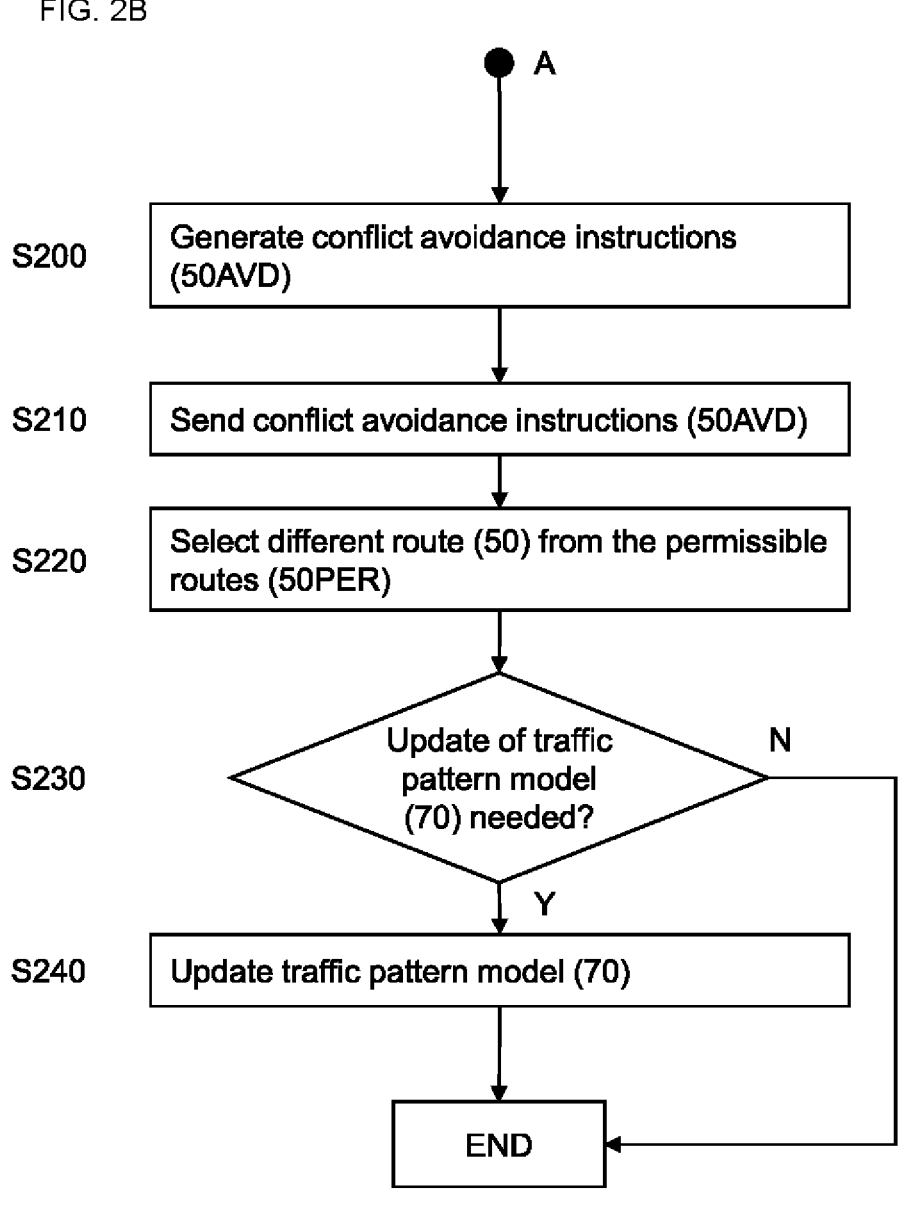

FIG. 2B shows the further steps of the flow chart describing the operation of the autonomous transportation network 10 described in FIG. 2A. If one of the predicted conflicts 60 is found in the overlaps of the predicted positions 100 in step S190, the conflict avoidance instructions 50AVD are generated by the control management center 200 in step S200, as shown in FIG. 2B. In the event that the control management center 200 determines that the multi-featured autonomous vehicle 20 needs to deviate from the selected permissible route 50PER, then the control management center 200 sends conflict avoidance instructions 50AVD to the multi-featured autonomous vehicle 20 using the infrastructure elements 80, as described below. The control management center 200 therefore only needs to interact with the multi-featured autonomous vehicles 20 if one of the predicted conflicts 60 is found in the overlaps of the predicted positions 100.

The control management center 200 does not send these conflict avoidance instructions 50AVD directly to the multi-featured autonomous vehicle 20, but in step S210 the conflict avoidance instructions 50AVD are sent to one or more of the infrastructure elements 80 which can then redirect or slow the multi-featured autonomous vehicle 20, as already explained in the description of FIG. 1 above. In step S220 the onboard processor 27 selects a different one of the permissible routes 50PER using the conflict avoidance instructions 50AVD and the structure model 75. There is no need for the control management center 200 to broadcast to all of the multi-featured autonomous vehicles 20 in the autonomous transportation network 10 information about the conflict 60. Only those autonomous vehicles 20 that have selected the route 50 which passes through the conflict 60 will receive the conflict avoidance instructions 50AVD from the infrastructure element 80. This eliminates much of the potential data traffic sent from the control management center 200.

In step S230, a check is conducted to determine if the traffic pattern model 70 needs updating after the corrected route instructions 50COR are sent. An update of the traffic pattern model 70 is conducted in step S240, comprising analyzing the corrected route instructions 50COR sent to the plurality of the multi-featured autonomous vehicles 20.

REFERENCE NUMERALS

5 method of operation
10 autonomous transportation network
10DIM permissible vehicle dimensions
10DYN permissible vehicle dynamics
15DIM real vehicle dimensions

15DYN real vehicle dynamics
20 multi-featured autonomous vehicles
25 vehicle antenna
27 onboard processor
28 vehicle memory
29 passenger
30 origin
35 destination
37 request
40 sensing elements
45 interaction data
50 route
50PER permissible routes
50COR corrected route instructions
50AVD conflict avoidance instructions
55 road
60 conflicts
65 restrictions
70 traffic pattern model
75 structure model
80 infrastructure element
90 deep-learning algorithm
100 predicted positions
150 system
200 control management center
205 control management processor
210 central memory

What is claimed is:

1. A method of operation for a plurality of multi-featured autonomous vehicles in an autonomous transportation network, the method comprising:

receiving, in a control management center having a control management processor and a central memory having a structure model stored therein, a request from a passenger, wherein the request comprises a destination;

transmitting the request to at least one of the plurality of multi-featured autonomous vehicles, said one of the plurality of autonomous vehicles having an onboard processor and an onboard memory, wherein said structure model is stored on said onboard memory;

calculating, in the control management center and the at least one of the plurality multi-featured autonomous vehicles a plurality of permissible routes from an origin to the destination, wherein the calculating in the control management center is done independently from the calculating in the at least one of the plurality multi-featured autonomous vehicles, wherein the plurality of the permissible routes is calculated comparing at least one of real vehicle dimensions and real vehicle dynamics for the ones one of the multi-featured autonomous vehicles to one of permissible vehicle dimensions and permissible vehicle dynamics for one of a road, wherein the plurality of permissible routes calculated in the control management center and the at least one of the plurality multi-featured autonomous vehicles are calculated using the structure model stored in the central memory and the onboard memory and are identical;

selecting, in the control management center and the at least one of the plurality multi-featured autonomous vehicles, a route from the plurality of permissible routes for the at least one of the plurality of the multi-featured autonomous vehicles, wherein the selecting in the control management center is done independently from the selecting in the at least one of the plurality multi-featured autonomous vehicles and wherein the at least one of the plurality of multi-featured autonomous vehicles and the control management center do not need to communicate the selected route to each other;

predicting, in the control management center, using a plurality of predicted positions and a traffic pattern model stored in the control management center, conflicts for the at least one of the plurality of the multi-featured autonomous vehicles;

generating, using the conflicts predicted by the control management center (200), conflict avoidance instructions; and adjusting, in case conflicts are predicted, the route of the at least one of the plurality of the multi-featured autonomous vehicles using the conflict avoidance instructions.

2. The method of claim 1, further comprising:

continuously updating the traffic pattern model based on travel patterns of the multi-featured autonomous vehicles using interaction data from at least one of a plurality of sensing elements and a deep-learning algorithm.

3. The method of claim 1, further comprising:

transmitting the conflict avoidance instructions, using ones of infrastructure elements, to at least one of the multi-featured autonomous vehicles and thereby adjusting the route of the multi-featured autonomous vehicles.

4. The method of claim 1, further comprising:

determining available road space for avoidance of the conflicts and enabling movement of ones of the plurality of the multi-featured autonomous vehicles by determining presence of ones of the multi-featured autonomous vehicles or objects at the predicted positions.

5. The method of claim 1, further comprising:

notifying other ones of the plurality of multi-featured autonomous vehicles to avoid the conflicts, using infrastructure elements transmitting the conflict avoidance instructions.

6. The method of claim 1, further comprising:

transmitting to at least one of the plurality of the multi-featured autonomous vehicles travelling on a diversionary route conflict avoidance instructions, using ones of infrastructure elements, to enable another one of the moving multi-featured autonomous vehicles to proceed unhindered along the diversionary route.

7. The method of claim 1, further comprising:

adjusting speeds of other ones of the plurality of the multi-featured autonomous vehicles, using conflict avoidance instructions sent by ones of infrastructure elements, to free road space for a first one of the plurality of the moving multi-featured autonomous vehicles.

8. The method of claim 1, further comprising:

at a junction creating road space by transmitting conflict avoidance instructions notifying the plurality of the multi-featured autonomous vehicles to avoid entry into the junction of other ones of the plurality of multi-featured autonomous vehicles.

9. A system for operation of an autonomous transportation network, the system comprising:

a central memory comprising a traffic pattern model for the autonomous transportation network, and a plurality of the permissible routes between an origin and a destination for a plurality of multi-featured autonomous vehicles in the autonomous transportation network;

a control management processor for:

calculation of the plurality of permissible routes using the a traffic pattern model in the central memory, wherein the calculation is done independently from a calculation of permissible routes in the plurality of multi-featured autonomous vehicles and wherein the plurality of permissible routes calculated by the control management processor and the plurality of permissible routes calculated by the at least one of the plurality of multi-featured autonomous vehicles using the traffic pattern module are identical;

selection of a route from the plurality of permissible routes for at least one of the plurality of the multi-featured autonomous vehicles, wherein the selection is done independently from a selection of the route in the at least one of the plurality multi-featured autonomous vehicles and wherein the control management processor does not need to communicate the selected route to the at least one of the plurality multi-featured autonomous vehicles; and calculation of conflict avoidance instructions using the traffic pattern model and a plurality of predicted positions, calculated from the plurality of the permissible routes, based on prediction of conflicts for ones of the plurality of the multi-featured autonomous vehicles; and at least one of a road, wherein sections of the road further comprise features limiting the ones of the multi-featured autonomous vehicles permitted to travel on the section of the road, the features comprising at least one of a width, a height, a curvature, an incline, or a weight restriction of the section of the road.

10. The system of claim 9, further comprising:

a plurality of infrastructure elements connected to the control management center and receiving the conflict avoidance instructions from the control management center for transmission to one or more of the plurality of multi-featured autonomous vehicles.

11. The system of claim 9, further comprising:

sensing elements disposed in the autonomous transportation network.

12. The system of claim 9, wherein:

the road comprises at least one of a single-lane road, allowing the ones of the multi-featured autonomous vehicles to travel in opposing directions, a two-lane road, having a separate one of a lane in each one of a direction, or a multi-lane road with at least three lanes.

* * * * *